United States Patent
Butcher et al.

(10) Patent No.: US 9,672,362 B2
(45) Date of Patent: Jun. 6, 2017

(54) SYSTEMS AND METHODS FOR SECURE DELIVERY OF PUBLIC KEYS FOR OPERATING SYSTEM DRIVERS

(71) Applicant: Dell Products L.P., Round Rock, TX (US)

(72) Inventors: Andrew Butcher, Cedar Park, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 14/328,946

(22) Filed: Jul. 11, 2014

(65) Prior Publication Data

US 2016/0012232 A1 Jan. 14, 2016

(51) Int. Cl.
  *G06F 21/00* (2013.01)
  *G06F 21/57* (2013.01)
  *G06F 21/51* (2013.01)
  *H04L 9/32* (2006.01)

(52) U.S. Cl.
  CPC ............ *G06F 21/575* (2013.01); *G06F 21/51* (2013.01); *H04L 9/3247* (2013.01)

(58) Field of Classification Search
  CPC .............................. G06F 21/50; G06F 21/572
  See application file for complete search history.

(56) References Cited

U.S. PATENT DOCUMENTS

| | | | |
|---|---|---|---|
| 6,263,431 B1* | 7/2001 | Lovelace | G06F 21/575 713/2 |
| 7,213,152 B1* | 5/2007 | Gafken et al. | 713/187 |
| 2001/0007131 A1* | 7/2001 | Galasso et al. | 713/187 |
| 2008/0120499 A1* | 5/2008 | Zimmer et al. | 713/2 |

* cited by examiner

*Primary Examiner* — Jeffrey Pwu
*Assistant Examiner* — Thong Truong
(74) *Attorney, Agent, or Firm* — Jackson Walker L.L.P.

(57) ABSTRACT

In accordance with these and other embodiments of the present disclosure, an information handling system may include a processor and a basic input/output system (BIOS) comprising a program of instructions executable by the processor and configured to cause the processor to initialize one or more information handling resources of the information handling system. The BIOS may be further configured to authenticate a signature of a BIOS driver associated with an information handling resource of the information handling system, and, in response to authenticating the signature of the BIOS driver, extracting a vendor public key from the BIOS driver and storing the vendor public key to a key database of the BIOS, wherein the vendor public key may be used by an operating system to authenticate one or more signed operating system drivers signed with a private key corresponding to the vendor public key.

20 Claims, 1 Drawing Sheet

SYSTEMS AND METHODS FOR SECURE DELIVERY OF PUBLIC KEYS FOR OPERATING SYSTEM DRIVERS

TECHNICAL FIELD

The present disclosure relates in general to information handling systems, and more particularly to methods and systems for secure delivery of public keys for operating system drivers on an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, a driver may comprise a program of instructions configured to, when read and executed by a processor, provide a software interface between an operating system or preboot execution environment executing on the processor and firmware or hardware executing on an information handling resource for which the driver is associated. In order to prevent the introduction of malicious code that mimics a hardware driver, information handling systems are increasingly including mechanisms whereby a vendor of an information handling resource and its associated driver may digitally sign a driver with a private key, and such signature may be verified by an operating system or preboot execution environment with a public key provided by the vendor and stored in a key database accessible to the operating system or preboot execution environment, as applicable. In some operating systems, the population of such a key database to add new drivers (e.g., updates, bug fixes, etc.) often requires manual intervention by a user. Such manual intervention may be impractical when such new drivers must be applied to a broad set of servers in a computing enterprise.

SUMMARY

In accordance with the teachings of the present disclosure, the disadvantages and problems associated with securely delivering public keys for operating system drivers may be reduced or eliminated.

In accordance with these and other embodiments of the present disclosure, an information handling system may include a processor and a basic input/output system (BIOS) comprising a program of instructions executable by the processor and configured to cause the processor to initialize one or more information handling resources of the information handling system. The BIOS may be further configured to authenticate a signature of a BIOS driver associated with an information handling resource of the information handling system, and, in response to authenticating the signature of the BIOS driver, extracting a vendor public key from the BIOS driver and storing the vendor public key to a key database of the BIOS, wherein the vendor public key may be used by an operating system to authenticate one or more signed operating system drivers signed with a private key corresponding to the vendor public key.

In accordance with these and other embodiments of the present disclosure, a method may include comprising authenticating a signature of a basic input/output system (BIOS) driver associated with an information handling resource of an information handling system, and in response to authenticating the signature of the BIOS driver, extracting a vendor public key from the BIOS driver and storing the vendor public key to a key database of a BIOS, wherein the vendor public key may be used by an operating system to authenticate one or more signed operating system drivers signed with a private key corresponding to the vendor public key.

In accordance with these and other embodiments of the present disclosure, an article of manufacture may include a computer readable medium and computer-executable instructions carried on the computer readable medium. The instructions may be readable by a processor, and, when read and executed, for causing the processor to authenticate a signature of a basic input/output system (BIOS) driver associated with an information handling resource of an information handling system, and, in response to authenticating the signature of the BIOS driver, extract a vendor public key from the BIOS driver and store the vendor public key to a key database of a BIOS, wherein the vendor public key may be used by an operating system to authenticate one or more signed operating system drivers signed with a private key corresponding to the vendor public key.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
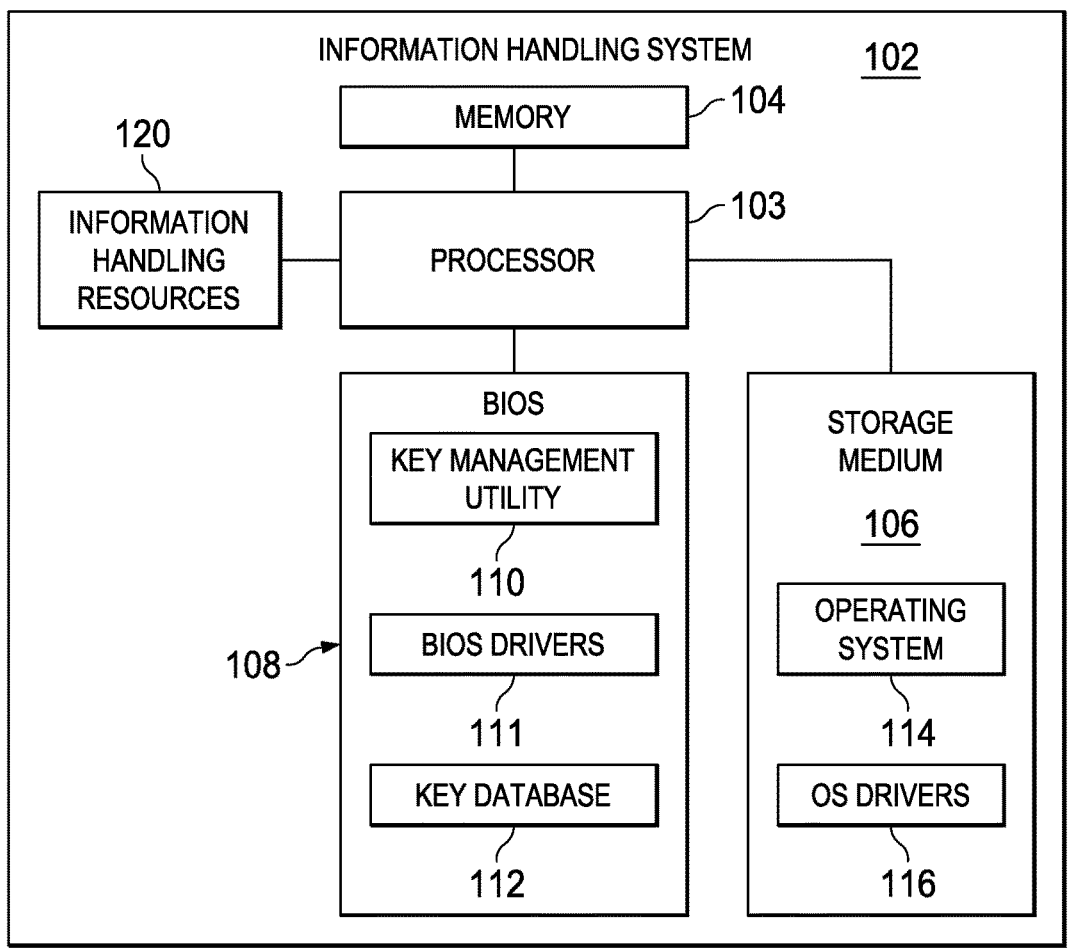
FIG. 1 illustrates a block diagram of an example information handling system, in accordance with embodiments of the present disclosure.
Figure 2:
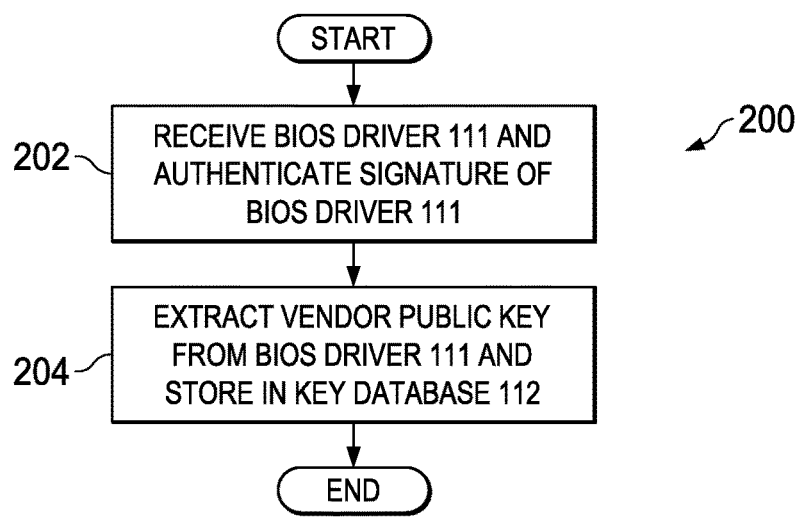
FIG. 2 illustrates a flow chart of an example method for automatic secure delivery of a public key for an operating system driver, in accordance with embodiments of the present disclosure.

Preferred embodiments and their advantages are best understood by reference to FIGS. 1 through 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a storage medium 106 communicatively coupled to processor 103, a basic input/output system (BIOS) 108 communicatively coupled to processor 103, and one or more other information handling resources 120 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage medium 106, BIOS 108, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage medium 106 may be communicatively coupled to processor 104 and may include any system, device, or apparatus operable to store information processed by processor 103. Storage medium 106 may include, for example, network attached storage, one or more direct access storage devices (e.g., hard disk drives), and/or one or more sequential access storage devices (e.g., tape drives). As shown in FIG. 1, storage medium 106 may have stored thereon an operating system (OS) 114, and one or more OS drivers 116.

OS 114 may be any program of executable instructions, or aggregation of programs of executable instructions, configured to manage and/or control the allocation and usage of hardware resources such as memory, CPU time, disk space, and input and output devices, and provide an interface between such hardware resources and application programs hosted by OS 114. Active portions of OS 114 may be transferred to memory 104 for execution by processor 103.

An OS driver 116 may comprise a program of instructions configured to, when read and executed by processor 103, provide an interface between operating system 114 and hardware or firmware executing on an information handling resource 120. In some embodiments, an OS driver 116 may be digitally signed by a vendor of such OS driver 116 with a private key of the vendor.

BIOS 108 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 108 may be implemented as a program of instructions that may be read by and executed on processor 103 to carry out the functionality of BIOS 108. In these and other embodiments, BIOS 108 may comprise boot firmware configured to be the first code executed by processor 103 when information handling system 102 is booted and/or powered on. As part of its initialization functionality, code for BIOS 108 may be configured to set components of information handling system 102 into a known state, so that one or more applications (e.g., operating system 114 or other application programs) stored on compatible media (e.g., memory 104, storage medium 106) may be executed by processor 103 and given control of information handling system 102. As shown in FIG. 1, BIOS 108 may include a key management utility 110, BIOS drivers 111, and a key database 112.

As described in greater detail elsewhere in this disclosure, key management utility 110 may include any system, device, or apparatus configured to, during execution of BIOS 108, facilitate the secure delivery of vendor-provided public keys to key database 112 and key database 118. In some embodiments, key management utility 110 may be implemented as a program of instructions that may be read by and executed on processor 103 to carry out the functionality of key management utility 110.

A BIOS driver 111 may comprise a program of instructions configured to, when read and executed by processor 103, provide an interface between BIOS 108 and hardware or firmware executing on an information handling resource 120. In some embodiments, a BIOS driver 111 may be digitally signed by a vendor of an operating system (e.g., operating system 114) or other key provider with a private key. Furthermore, in accordance with embodiments of the present disclosure, a BIOS driver 111 may include a public key associated with the BIOS driver 111. In some of such embodiments, the public key associated with as BIOS driver 111 of an information handling resource may be also be used in authenticating a corresponding OS driver 116 of the information handling resource, as described in greater detail below.

Key database 112 may include a map, list, table, or other data structure for storing one or more public keys extracted from BIOS drivers 111 and/or associated with OS drivers 111. The mechanism for extraction of public keys from BIOS drivers 111 is described in greater detail below. In addition, entries in key database 112 may be utilized by BIOS 108 to authenticate digital signatures of BIOS drivers 111. For example, for each BIOS driver 111, key database 112 may comprise an extracted vendor-provided public key associated with the private key used to sign the BIOS driver 111. Thus, when loading a BIOS driver 111, BIOS 108 may authenticate the digital signature of BIOS driver 111 using a corresponding key in key database 112, and only execute such BIOS driver 111 if its signature is authenticated. In addition, entries in key database 112 may be utilized by OS 114 to authenticate digital signatures of OS drivers 116. For example, for each OS driver 116, key database 112 may comprise a vendor-provided public key associated with the private key used to sign the OS driver 116. Thus, when loading an OS driver 116, OS 114 may authenticate the digital signature of OS driver 116 using a corresponding key in key database 112, and only execute such OS driver 116 if its signature is authenticated. In some embodiments, key database 112 may be stored within a database of BIOS 108 known as "db."

Generally speaking, information handling resources 120 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

In operation, a vendor public key may be contained within a BIOS driver 111 for an information handling resource 120. A BIOS driver 111 and a OS driver 116 may be provided by the same vendor of the information handling resource 120 being controlled by such BIOS driver 111 and OS driver 116, and thus the vendor public key embedded in a BIOS driver 111 may correspond to the private key used to sign the corresponding OS driver 116. The BIOS driver 111 may also be signed with a digital signature (e.g., a private key provided by a vendor of OS 114), and may be authenticated during a boot process (e.g., with a corresponding public key provided by a vendor of OS 114).

BIOS 108 may, after authenticating a BIOS driver 111, extract the vendor public key embedded in such BIOS driver 111, and store such public key in key database 112. During subsequent execution of BIOS 108 and OS 114, BIOS 108 and OS 114 may retrieve public keys from key database 112 to authenticate BIOS drivers 111 and OS drivers 114, respectively.

FIG. 2 illustrates a flow chart of an example method 200 for automatic secure delivery of a public key for an operating system driver, in accordance with embodiments of the present disclosure. According to some embodiments, method 200 may begin at step 202. As noted above, teachings of the present disclosure may be implemented in a variety of configurations of information handling system 102.

At step 202, BIOS 108 may receive a BIOS driver 111 and authenticate a signature of the BIOS driver 111. At step 204, BIOS 108 may extract a vendor public key for use by OS 114 to authenticate OS drivers 116 provided by the same vendor of BIOS driver 111, and store the public key in key database 112. BIOS 108 may extract the vendor public key from a BIOS driver 111 in any suitable manner. For example, in some embodiments, a firmware management protocol (FMP) portion of the BIOS driver 111 may provide an index within BIOS driver 111 and a GetImage or similar function of BIOS 108 may use such index to extract the vendor public key. As another example, BIOS 108 may extract the public key from the tail of the BIOS driver 111 by an agreed-upon convention or standard regarding the size of the public key. As a further example, BIOS driver 111 may include executable code for writing the public key to key database 112. As yet another example, BIOS 108 may comprise a standard mechanism, such as Extensible Firmware Interface (EFI) adapter information protocol to determine presence of a public key and in a BIOS driver 111 and retrieve the public key from the BIOS driver.

After completion of step 204, method 200 may end. During subsequent execution of BIOS 108 and OS 114, BIOS 108 and OS 114 may retrieve public keys from key database 112 to authenticate BIOS drivers 111 and OS drivers 116, respectively.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
   a processor; and
   a basic input/output system (BIOS) comprising a program of processor-executable BIOS instructions that, when executed, cause the processor to:
   initialize one or more information handling resources of the information handling system; and
   perform extended BIOS operations, comprising:
      receiving a BIOS driver update, comprising an update of a BIOS driver configured to provide an interface between the BIOS and hardware or firmware of an information handling resource of the information handling system;
      authenticating a signature of the BIOS driver update;
      extracting a vendor public key from the BIOS driver update and storing the vendor public key to a key database of the BIOS; and
      authenticating, in accordance with the vendor public key, a signed operating system driver, distinct from the BIOS driver and the BIOS driver update.

2. The information handling system of claim 1, wherein the BIOS comprises a Unified Extensible Firmware Interface (UEFI).

3. The information handling system of claim 2, wherein the BIOS driver update includes information, compliant with an Extensible Firmware Interface (EFI) adapter protocol, to determine presence of the vendor public key and to retrieve the public key from the BIOS driver.

4. The information handling system of claim 1, wherein the BIOS driver, the BIOS driver update, and the signed operating system driver are all provided by a particular vendor and wherein the vendor public key comprises a public key of the particular vendor.

5. The information handling system of claim 1, wherein a firmware management protocol (FMP) portion of the BIOS driver includes a public key index indicative of a location of the vendor public key within the BIOS driver.

6. The information handling system of claim 5, wherein extracting the vendor public key comprises invoking a get image function of the BIOS in accordance with the public key index.

7. The information handling system of claim 1, wherein extracting the vendor public key comprises extracting the vendor public key from a tail of the BIOS driver update in accordance with a predetermined size of the public key.

8. The information handling system of claim 1, wherein the BIOS driver update includes processor-executable code for writing the vendor public key to the key database of the BIOS.

9. A method comprising:
   initializing one or more information handling resources of an information handling system;
   receiving a basic input/output system (BIOS) driver update, comprising an update of a BIOS update configured to provide an interface between the BIOS and hardware or firmware of an information handling resource of the information handling system;
   authenticating a signature of the BIOS driver update;
   extracting a vendor public key from the BIOS driver update; and
   authenticating, in accordance with the vendor public key, a signed operating system driver, distinct from the BIOS driver and the BIOS driver update.

10. The method of claim 9, wherein the BIOS comprises a Unified Extensible Firmware Interface (UEFI).

11. The method of claim 10, wherein the BIOS driver update includes information, compliant with an Extensible Firmware Interface (EFI) adapter protocol, to determine presence of the vendor public key and to retrieve the public key from the BIOS driver.

12. The method of claim 9, wherein the BIOS driver, the BIOS driver update, and the signed operating system driver are all provided by a particular vendor and wherein the vendor public key comprises a public key of the particular vendor.

13. The method of claim 9, wherein a firmware management protocol (FMP) portion of the BIOS driver includes a public key index indicative of a location of the vendor public key within BIOS driver.

14. The method of claim 13, wherein extracting the vendor public key comprises invoking a get image function of the BIOS in accordance with the public key index.

15. The method of claim 9, wherein extracting the vendor public key comprises extracting the vendor public key from a tail of the BIOS driver update in accordance with a predetermined size of the public key.

16. The method of claim 9, wherein the BIOS driver update includes processor-executable code for writing the vendor public key to the key database of the BIOS.

17. An article of manufacture comprising a non-transitory computer readable medium including processor-executable instructions that, when read and executed by the processor, causing the processor to perform operations comprising:
   receiving a basic input/output system (BIOS) driver update, comprising an update of a BIOS driver configured to provide an interface between a BIOS of an information handling system and hardware or firmware of an information handling resource of the information handling system;
   authenticating a signature of the BIOS driver update;
   extracting a vendor public key from the BIOS driver update and; and
   authenticating, in accordance with the vendor public key, a signed operating system driver, distinct from the BIOS driver and the BIOS driver update.

18. The article of claim 17, wherein the BIOS comprises a Unified Extensible Firmware Interface (UEFI).

19. The article of claim 17, wherein the BIOS driver, the BIOS driver update, and the signed operating system driver are all provided by a particular vendor and wherein the vendor public key comprises a public key of the particular vendor.

20. The article of claim 17, wherein a firmware management protocol (FMP) portion of the BIOS driver includes a public key index indicative of a location of the vendor public key within BIOS driver and further wherein extracting the vendor public key comprises invoking a get image function of the BIOS in accordance with the public key index.

\* \* \* \* \*

UNITED STATES PATENT AND TRADEMARK OFFICE
CERTIFICATE OF CORRECTION

PATENT NO. : 9,672,362 B2
APPLICATION NO. : 14/328946
DATED : June 6, 2017
INVENTOR(S) : Andrew Butcher and Mukund P. Khatri Page 1 of 1

It is certified that error appears in the above-identified patent and that said Letters Patent is hereby corrected as shown below:

In the Claims

Column 8, Line 31, Claim 13 should read:
  13. The method of Claim 9, wherein a firmware management protocol (FMP) portion of the BIOS driver includes a public key index indicative of a location of the vendor public key within the BIOS driver.

Column 8, Line 45, Claim 17 should read:
  17. An article of manufacture comprising a non-transitory computer readable medium including processor-executable instructions that, when read and executed by the processor, cause the processor to perform operations comprising:
    receiving a basic input/output system (BIOS) driver update, comprising an update of a BIOS driver configured to provide an interface between a BIOS of an information handling system and hardware or firmware of an information handling resource of the information handling system;
    authenticating a signature of the BIOS driver update;
    extracting a vendor public key from the BIOS driver update; and
    authenticating, in accordance with the vendor public key, a signed operating system driver, distinct from the BIOS driver and the BIOS driver update.

Column 9, Line 1, Claim 20 should read:
  20. The article of Claim 17, wherein a firmware management protocol (FMP) portion of the BIOS driver includes a public key index indicative of a location of the vendor public key within the BIOS driver and further wherein extracting the vendor public key comprises invoking a get image function of the BIOS in accordance with the public key index.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*